NEIL R. SPARKS
INVENTOR.

ATTORNEY.

NEIL R. SPARKS
INVENTOR.

NEIL R. SPARKS
INVENTOR.

BY *Newell Pottoff*

ATTORNEY.

United States Patent Office 3,343,626
Patented Sept. 26, 1967

3,343,626
CANCELLING SEISMIC MULTIPLE REFLECTIONS BY TRANSMITTING ONLY THE DOWN-TRAVELLING SEISMIC SIGNALS DETECTED FROM THE ORIGINAL TRANSMITTED SIGNAL
Neil R. Sparks, Tulsa, Okla., assignor to Pan American Petroleum Corporation, Tulsa, Okla., a corporation of Delaware
Filed Jan. 18, 1965, Ser. No. 426,315
13 Claims. (Cl. 181—.5)

This invention relates to seismic geophysical surveying and is directed particularly to a method of seismic surveying wherein certain types of multiple reflections are automatically cancelled. More particularly, the invention is directed to a method of seismic surveying wherein a controllable generator of seismic waves is utilized a first time to produce a signal including certain reflections, which signal is then used to energize the wave-generating device a second time in such a way as to produce a final record wherein the primary and certain multiple reflections are present in an altered amplitude ratio. Advantage is then taken of this alteration in the ratio of primary and multiple reflection amplitudes to prepare a final record display wherein certain multiple reflections are substantially reduced or eliminated.

In seismic geophysical surveying, a particularly troublesome source of error is the recognized or unrecognized occurrence of multiple reflections. Not only are multiple reflections sometimes mistaken for primary reflections from interfaces which do not exist, but multiple reflections may also obscure true primary reflections which occur at about the same record time. In certain areas and under certain conditions, the strength of the multiple reflected seismic energy may be so great as to prevent observing the desired primary reflections.

Various attempts have been made to deal with this problem. One of the most common involves the fact that the normal moveout for multiple reflections is usually different from that for primary reflections. By utilizing long spread offsets wherein the normal moveout corrections are substantial, superposition of traces corrected for normal moveout of primary reflections produces summation traces wherein the primary reflections are enhanced, while the multiple reflections tend in some degree to cancel each other. This is sometimes a partial solution to the problem, but it nevertheless is limited in its ability to detect weak primary reflections in the presence of strong multiples; and also, it is not always true that the normal moveouts of primary and of multiple reflections differ sufficiently for effective cancellation of the multiples.

An alternative solution to the problem has been proposed wherein a servo-controlled form of vibrator has been utilized as a means of applying to the earth, during the recording of seismic waves from a primary source, signals that arrive simultaneously but out of phase with the multiple reflections so as to produce cancellation of these reflections in the finally detected signals. One difficulty with this technique, however, is that it is frequently difficult by means of a servo-controlled vibrator to introduce into the earth signals of sufficient strength to produce the necessary cancellation at the detectors after travel through the earth's subsurface.

In view of the foregoing it is a primary object of my invention to provide a novel method and apparatus for discriminating against or substantially eliminating certain seismic multiple reflections. A further object of my invention is to provide a novel method and apparatus of seismic multiple-reflection cancellation wherein the limitation of energy input into the ground to produce cancelling signals at the wave receivers is avoided. A still further object of my invention is to provide a novel method and apparatus for multiple-reflection cancellation in seismic surveying, wherein the cancellation signals are automatically derived and inserted into the earth in the proper time relationship and relative amplitudes to produce substantially complete cancellations of certain multiples in the finally received waves. A still further object of my invention is to provide a method and apparatus of seismic multiple-reflection cancellation utilizing a servo-controlled vibrator or vibrators as the energy source over extended periods of introduction of energy into the ground, in such a way as to induce self-cancellation of the portions of the energy which are multiply reflected from the near-surface earth layers either during the recording of the field records or by subsequent playback and processing of the data. Other and further objects, uses, and advantages of the invention will become apparent as the description proceeds.

Briefly stated, my invention comprises generating near the earth's surface a first input signal which travels downwardly and is reflected by subterranean interfaces. The resulting waves are detected by a directional subsurface detector, such as a vertical spread array of detectors, at a substantial depth in the ground below the down-reflecting interfaces near the ground surface which are responsible for the major multiple reflections. The waves travelling vertically past the subsurface detector or spread are separated into upgoing and downgoing waves, which are then separately recorded. In recognition that it is the downgoing energy following the initial impulse which subsequently produces multiple reflections, the record of downgoing waves is used as the source of a second seismic-wave input signal applied to the ground surface, and the resulting upgoing waves are finally recorded, wherein the amplitude ratio of multiple to primary reflections is altered from its value for the first input.

In one embodiment of my invention the waves entering the ground during the second period of wave generation are applied in a sense to produce substantial multiple-reflection cancellation (i.e. a reduction in amplitude ratio to near zero) at the detectors when the up-travelling waves are finally received and recorded. According to another embodiment of the invention, the second wave generation increases the amplitude ratio of multiple to primary reflections, and a further processing step is employed in preparing a final display record wherein this difference in amplitude ratio is utilized to produce multiple-reflection cancellation.

As the principles of the invention do not depend upon the nature of the original input wave, it is adaptable either to impulse types of wave generation as by explosives, weight drops, and the like, or to wave generation processes that operate over substantial periods of time, of which the type known in the trade as "Vibroseis" is an example.

This will be better understood by reference to the accompanying drawings forming a part of this application and illustrating typical embodiments of the invention and the wave paths and resulting records in a diagrammatic fashion. In these drawings, FIGURE 1 is a diagrammatic representation of an earth cross-section with one embodiment of the apparatus of the invention in position for carrying out the process of the invention;

Figure 1:
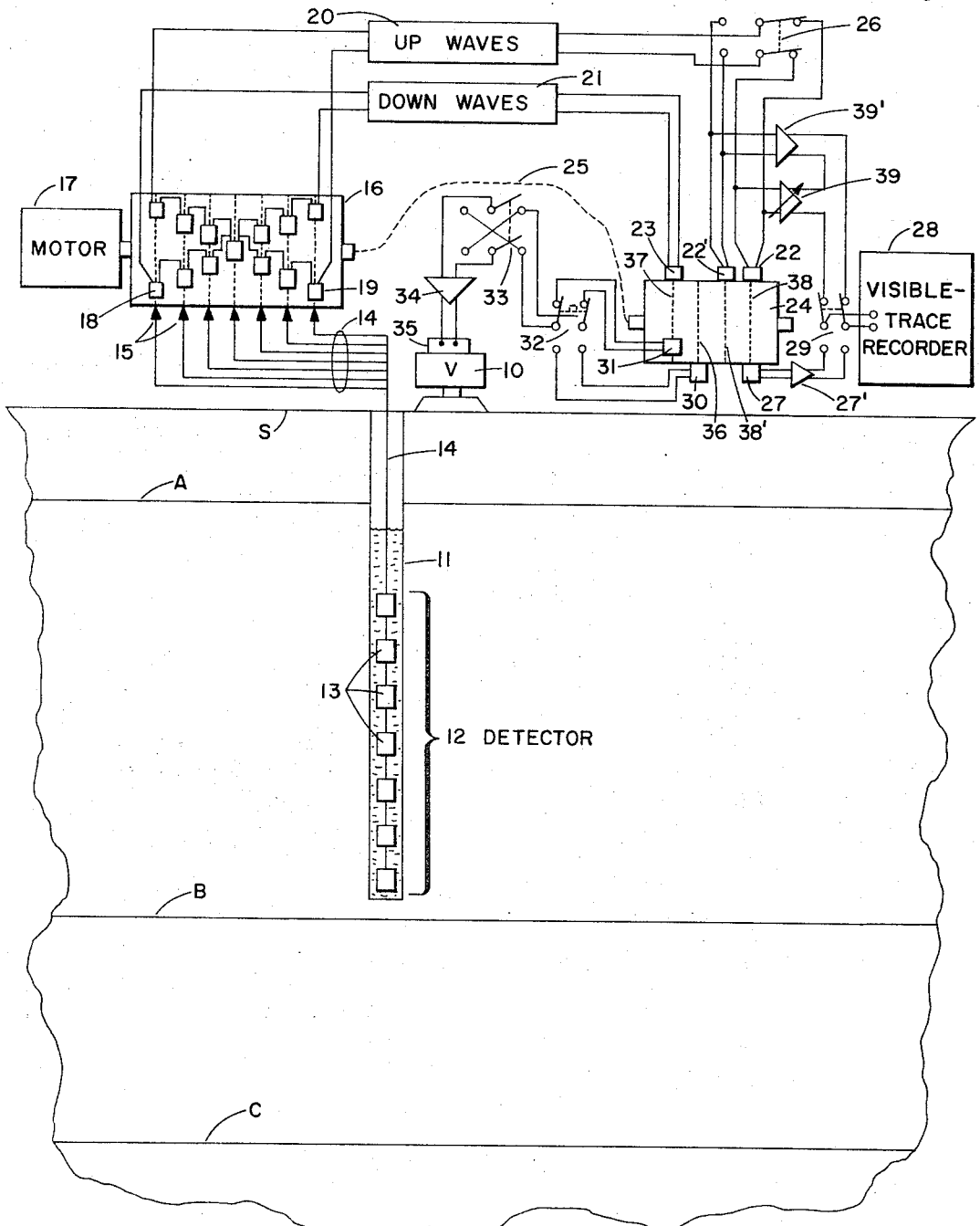

Referring now to these drawings and particularly to FIGURE 1 thereof, this figure shows diagrammatically a cross section of earth wherein S represents the earth's surface, and A, B, and C represent subsurface reflecting interfaces. At the ground surface S at the surveying location is positioned a controllable vibration generator 10 of known type such as that used in the "Vibroseis" process, which is capable of generating in the earth seismic waves that correspond in form to any desired signal input. A bore hole 11 nearby extends to some depth below the surface and preferably also below the interface A, wherein is located a directional detector 12 shown as comprising a vertical spread of individual seismic detectors 13. Each detector 13 may be a conventional seismometer or hydrophone that by itself is insensitive to the direction of travel of the compressional seismic waves passing by, so that determining the actual direction of wave travel requires compositing the outputs of two or more spaced detectors with appropriate relative time delays. The detector 13 may alternatively be a dual-element system of the type shown in my U.S. Patent 2,846,662 that by itself is directionally sensitive to compressional seismic waves. Such a dual-element detector may be used alone, or as part of a vertical spread of several such seismometers with augmented directional discrimination. The individual detectors 13 of the spread 12 are connected by separate conductors of a cable 14 to a corresponding array of magnetic recording heads 15 which record, on the magnetic surface of a rotatable drum 16 turned at constant speed by a motor 17, individual traces representing the signals detected by individual detectors 13.

The traces so recorded are scanned by arrays of reproducing heads 18 and 19, arranged in staggered relationships as shown, so as to compensate for the vertical travel time of compressional seismic waves between the individual detectors 13 of the spread 12. The reproducing heads 18, for example, are staggered and connected in series so as to place in phase and sum down-travelling waves past spread 12, while reproducers 19 are oppositely staggered and connected in series so as to place in phase and sum the up-travelling waves past detector spread 12. The down-travelling waves are amplified by an amplifier 21 and recorded as a trace 37 by a recording head 23 on a magnetic drum 24 rotated in synchronism with drum 16, as is indicated by a mechanical connection 25. Similarly, the up-travelling waves detected by reproducers 19 are amplified by an amplifier 20 and recorded as a trace 38 on the drum 24 by a recording head 22. By a selector switch 26 the output of up-travelling wave amplifier 20 can be shifted to a recording head 22' for recording on drum 24 as a trace 38'. Also present on drum 24 is a pre-recorded initiating trace 36 carrying a first input signal for the generator 10, as will be subsequently explained.

Cooperating with initiating trace 36 is a reproducing head 30, while trace 37 of the down-going waves is scanned for reproduction by a reproducing head 31, movable about the periphery of drum 24 to introduce any desired time shifting. The output either of the head 30 or of the head 31, as determined by a selector switch 32, is applied through a polarity-reversing switch 33 and an amplifier 34 to the control unit 35 of the generator or vibrator 10. The form of the seismic waves generated by vibrator 10 thus is made to correspond to the wave forms present on trace 36 or trace 37.

Figure 2:
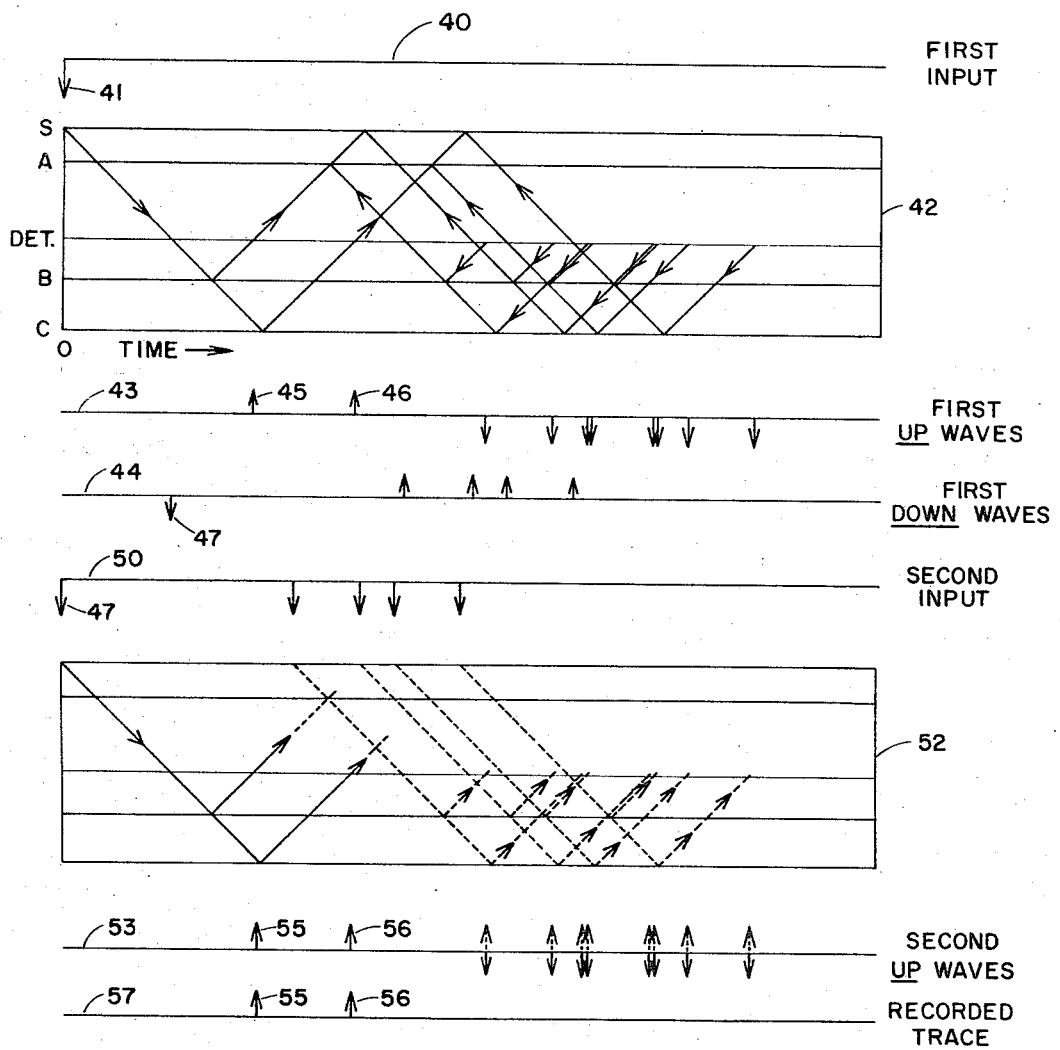
FIGURE 2 is a graphical representation of record traces and of the wave paths and travel times associated therewith in accordance with one embodiment of the invention illustrated in FIGURE 1.

This embodiment of the invention is capable of operation in at least two different ways, one of which is illustrated in FIGURE 2. Referring now to this latter figure, trace 40 represents the wave form which may be present on the first input track 36 of drum 24 and is transmitted from reproducing head 30, through selector switch 32 in its lower position, as an input to the vibrator or shaker 10 and thence to ground surface S. For simplicity, the form of the first input trace 40 is assumed to be simply a single impulse 41.

Diagram 42 of FIGURE 2 represents the various interfaces of FIGURE 1 designated by the letters S, A, B and C, and the relative detector position indicated as Det. This diagram is actually a time section rather than a depth section, the layer boundaries being separated in proportion to one-way seismic wave travel times, rather than actual distances traveled. Although the actual wave-travel paths through the earth between the generator 10 and the detector 12 in FIGURE 1 are all essentially vertical and along the same line, in diagram 42 they have been drawn as wave paths at a constant angle from the vertical, so that, if the horizontal dimension of the diagram 42 is regarded as proportional to record time, and zero time or the time of input of the impulse 41 is shown at the left edge of the diagram, wave travel time after the zero time origin takes place moving toward the right, while the intersections of the angular travel-path lines with any horizontal line indictae arrival times at that level. The times of events on the diagrammatic traces are referred to the same time origin and scale, so the trace 43 represents the up-travelling reflection-wave arrivals recorded by the detector 12 resulting from input of the impulse 41 at zero time.

It should also be noted that the arrows on the 45° travel paths indicate, not energy travel direction, but the phase of the energy at that portion of the path. Energy travel and time both proceed continuously from left to right of diagram 42.

The impulses 45 and 46 represent the primary reflection arrivals travelling up from the interfaces B and C to the detector. The subsequent arrivals of trace 43 are multiple reflections of these two arrivals after they travel on up, either to the interface A or the surface S, and are again down-reflected there, to be again reflected upwardly from the interface B or C to the detector position. These are the specific multiple reflections which it is the purpose of this invention to cancel.

Trace 44 is similar to trace 43 except that it represents the down-travelling energy passing detector 12. The recorded impulse 47 thus represents the first downward passage of impulse 41 past the detector, while the subsequent arrivals of trace 44 represent the down-reflections of the primary reflections 45 and 46 from the interface A and from the surface S.

Trace 50, derived from trace 44 simply by reversing the phase of the subsequent arrivals relative to the initial arrival 47, represents a preferred form of the second input to vibrator 10. Diagram 52 corresponds to diagram 42, with the exception that the paths shown in solid lines represent primary reflections of the impulse 47, in the same way as impulses 45 and 46 represent primary reflections of impulse 41 in diagram 42. The remainder of the solid-line reflection paths shown in diagram 42 have been omitted from diagram 52 to simplify the drawing, but they are to be understood as present, as the energy from the impulse 47 follows the same paths in diagram 52 and produces the same multiple reflections as does the corresponding energy from impulse 41 in the case of diagram 42.

The dashed-line paths of diagram 52 correspond to the application to the ground surface S, of the subsequent impulses of trace 50 following impulses 47. These signals travel to the subsurface interfaces B and C and are reflected upwardly therefrom, to arrive at the detector as up-travelling waves at the exact times and with the same phase as arrivals 55 and 56 which represent the primary reflections. On the other hand, the solid-line arrows of trace 53 following impulse 56 correspond to the multiple-reflection arrivals following impulse 46 on trace 43. As the impulse arrivals along the dotted-line paths of diagram 52 shown as dotted-line arrows on trace 53 are equal and opposite in phase to the solid-line arrivals, cancellations at the detector occur. The final recorded trace of up-travelling waves is therefore presented by trace 57, which contains only the primary reflection arrivals 55 and 56.

In operation, therefore, the earth in responding to the second signal input in a sense acts as its own multiple-reflection computer, in that the down-travelling waves act first to generate both primary and multiple reflections and second to generate automatic cancellation signals for the multiple reflections. The pattern of timing, amplitude, and phase of the multiple-cancellation signals is automatic, in that they are applied with the same time delay as occurred in their arrival as down-travelling waves at the detector 12, following the first downward passage of energy there. It is their subsequent traversal of the down-travelling portion of the multiple-reflection paths, shown as dotted lines in diagram 52, that makes the earth its own computer for the amplitude and phase of multiple-cancellation signals.

It should be noted further that in this embodiment it is not necessary that the trace 43 actually be recorded, as it is only the final trace 53 of up-travelling waves, which due to the cancellation in the earth, appears as trace 57 that is necessarily recorded for final interpretation. It may also be noted that the only multiple reflections which are cancelled by this process are those involving down-reflections from the interfaces above the detector, namely interfaces S and A, and any reverberations therebetween. No reverberations between the interfaces B and C and lower interfaces in the earth can be cancelled. This is a limitation to be kept in mind in choosing a proper depth for detector 12. However, to the extent that the most prominent multiples are generally associated with near-surface down-reflecting interfaces, cancellation of these multiples in most cases substantially improves the final records as regards interpretation.

With respect to the apparatus of FIGURE 1, the operation of this mode of the invention is as follows: the magnetic trace 36, corresponding to trace 40 bearing impulse 41, is reproduced as a corresponding electric wave by head 30 with selector switch 32 in its lower position. After appropriate amplification by reproducing amplifier 34, this electrical input signal is applied to control unit 35 of vibrator 10, which generates a seismic wave of corresponding form in the earth. The down-travelling wave trace 44 resulting from this seismic input is that trace recorded as magnetic track 37 by the recording head 23 from the reproducing head array 18. For the second input, selector switch 32 is shifted to its illustrated upper position of FIGURE 1, and head 31 reproduces magnetic trace 37 of down-travelling waves from the drum 24. Throwing the reversing switch 33 immediately after the playback of impulse 47 of trace 50, preferably done automatically by well-known delay means not shown, accomplishes the necessary phase reversal of the subsequent impulses of the trace 50 relative to the impulse 47 of traces 44 and 50. That is, properly timed action of reversing switch 33 transforms trace 44 into trace 50, and vibrator 10 generates a corresponding train of seismic impulses in the earth. Accordingly, the resultant final trace 57 of recorded up-travelling waves, provided by reproducer head array 19 through amplifier 20 and recording head 22, is the magnetic trace 38 on drum 24, which can be recorded or reproduced for visual inspection and interpretation by a reproducing head 27 driving a recording amplifier 27' connected to a visible-trace recorder 28 through a selector switch 29, which of course will be thrown to its lower position.

Figure 3:
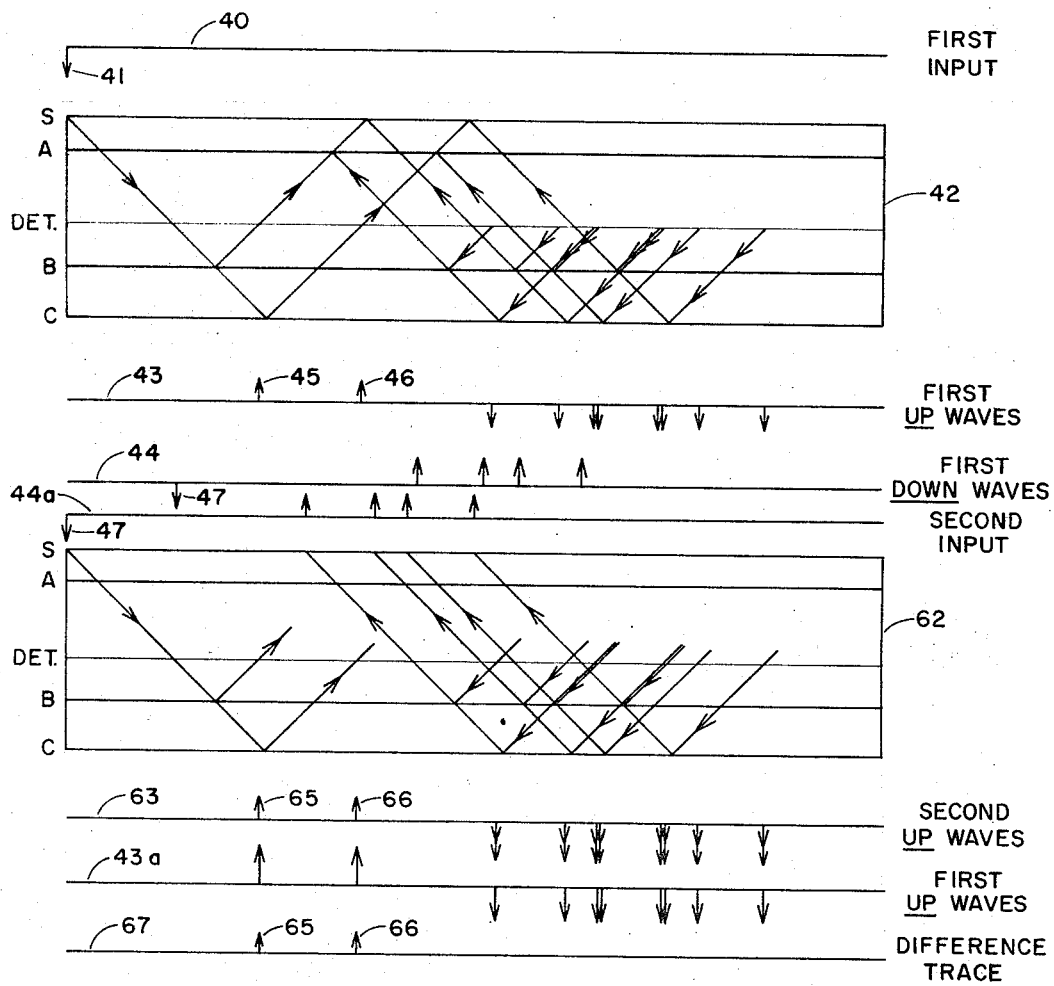
FIGURE 3 is an illustration of record traces and associated wave paths observed and utilized according to another embodiment of operation of the invention of FIGURE 1.

Although it may not always be possible or convenient to reverse the phase of subsequent down-travelling arrivals relative to the first-arriving down-travelling wave at the detector, as is done by reversing switch 33 in deriving second input trace 50 from the down-travelling wave trace 44, it is still possible to produce cancellation of the multiple reflections by utilizing the principles of the present invention as set forth in the embodiment illustrated by FIGURE 3. In this figure, the upper first input trace 40, carrying impulse 41 as the primary signal to be applied to the ground by vibrator 10 for preparing a second input trace which provides cancellation, and the various reflection paths and arrival times as illustrated by the diagram 42, correspond to those of FIGURE 2. Likewise, the up-travelling wave trace 43, which could optionally be or not be recorded in the embodiment of FIGURE 2, showing the primary arrivals 45 and 46, is necessarily recorded in this embodiment. The trace 44 of down-travelling waves, carrying the first down-travelling arrival 47 and the subsequent down-travelling arrivals, is used as the second input trace 44a in the exact form recorded.

The apparent time shift between traces 44 and 44a, which is simply the one-way travel time between the surface S and the detector depth (Det.), has several meanings. In the drawing, it relates the horizontal time scales of diagrams 42 and 62 to a common zero time. In an abstract physical sense, it moves detector 12, as the source of primary, multiple, and multiple-combining signals to the ground surface S, while the detector itself remains at its subsurface depth, as the detector of waves passing by it. Stated another way, the time shift advances the subsequent arrivals of trace 44 just enough to compensate for the added travel time involved in applying them at the ground surface, rather than at the detector depth, for later combining with and modifying the multiple reflections in the up-travelling waves.

Applying trace 44a to vibrator 10 and thence as an input to the ground surface S results in wave travel paths and arrivals as shown in diagram 62. This generally resembles diagram 52 except that the subsequent impulses following initial impulse 47 travel with opposite phase relative to their phase in diagram 52, in travelling to the detector of up-travelling waves. This results in a recorded up-travelling wave trace 63 wherein the primary reflections are represented by impulses 65 and 66, which duplicate impulses 45 and 46 of trace 43, but wherein the multiple-reflection arrivals following impulse 66 are reinforced rather than cancelled by the input pulses following pulse 47 on trace 44a. Thus, trace 63 corresponds to trace 43 except that the amplitude ratio of the multiples relative to the primaries, instead of approaching zero as in cancellation, is now increased. In order to produce cancellation of these multiples, trace 43 is employed as the amplified trace 43a, wherein the amplitudes of all arrivals have been increased so as to produce a substantial matching of the amplitudes of the multiple reflections. Then, upon subtracting trace 63 from trace 43a, a final trace 67 is obtained wherein the primary reflections 65 and 66 appear with substantially their original amplitude, whereas the multiples have been substantially cancelled.

With reference to the apparatus of FIGURE 1, its operation in carrying out this embodiment of the invention is as follows: Magnetic trace 36 is reproduced by pickup head 30 and applied as an input to the control mechanism 35 of vibrator 10 to travel thence as seismic waves in the earth, just as in the embodiment of FIGURE 2. The down-travelling waves (trace 44) are recorded on magnetic trace 37 and the up-travelling waves (trace 43) on magnetic trace 38 with switch 26 in its illustrated position. The down-travelling wave magnetic trace 37 then immediately becomes the input trace 44a to the vibrator 10 for the second input to vibrator 10 and thence as corresponding seismic waves in the earth, reversing switch 33 remaining in the same position throughout the playback of the trace, so that no phase reversal occurs between the initial impulse 47 and the subsequent impulses of the trace. For recording the second up-travelling wave trace 63, switch 26 is thrown to the left to connect the output of amplifier 20 to head 22', to record trace 63 as magnetic trace 38'.

To make a final display recording, heads 22 and 22' reproduce the respective tracks 38 and 38' into recording amplifiers 39 and 39' respectively, which have their outputs connected in phase opposition to produce subtraction.

A visible difference trace corresponding to trace 67 is then displayed by recorder 28, with switch 29 in its upper position as shown on the drawing. In practice, several such difference traces with different gain settings of amplifier 39 may be recorded, one of which can be easily seen to provide the best cancellation of multiples.

As no limitations are imposed on the form of the pulse 41 in the embodiment of FIGURE 3 due to the necessity of a partial phase reversal by the switch 33, as was done in converting trace 44 to trace 50 in FIGURE 2, it is apparent that the impulse 41 may be of any desired form. That is, it may be a single impulse, a multiplicity of such impulses, or even a continuous signal of varying frequency extending over a substantial period of time, as in the "Vibroseis" process. In other words, multiple reflections of even a prolonged, continuous, frequency-sweep signal may be made to change their amplitude ratio relative to the primary reflections of the same signal in the same way as impulses, so as to provide the possibility of multiple-reflection cancellation by subtraction, just as is illustrated in FIGURE 3 for single impulses. It is not necessary in the correlation record interpretation process that the records of up- and of down-travelling waves be separately cross-correlated with a counterpart of the input signal, before making the combination of traces for multiple reflection cancellation. Rather, the complex received wave traces can be subtracted from each other with different relative amplitude, and the final remainder traces can then be cross-correlated with the input signal counterpart to produce the indication of primary reflection arrivals corresponding to the impulses 65 and 66 of trace 67.

Figure 4:
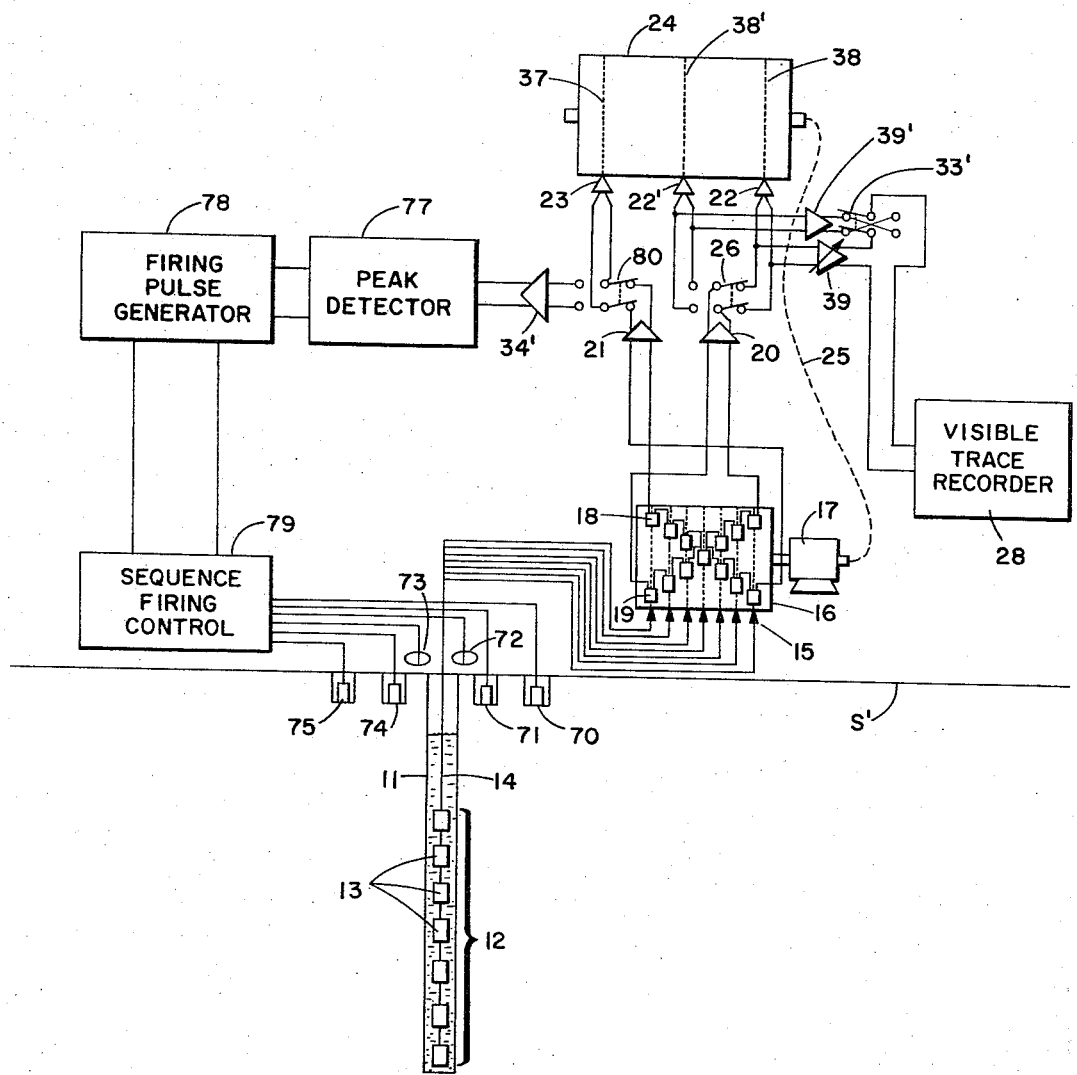
FIGURE 4 is a diagrammatic illustration similar to FIGURE 1 of an alternative embodiment of the invention utilizing a different form of source energy.

It is also not essential to this invention that the cancellation signals applied to the ground surface S be supplied by a vibrator or similar controllable transducer 10 in the manner shown in FIGURE 1. An alternative arrangement of apparatus for producing essentially the same result is illustrated in FIGURE 4. In this embodiment the wave-generating source comprises a plurality of shallow, buried explosive charges 70–75. Initially, a single one of the charges, such as the charge 70, is detonated to provide down-going and up-travelling waves corresponding to those produced by the vibrator impulse 41 of FIGURE 3. That is, traces 43 and 44 of that figure may be considered to represent the pattern of arrivals from the shot 70. The waves resulting from detonation of shot 70, as received by the detector 12, are initially recorded on the rotating drum 16 and composited for directional discrimination by the reproducer arrays 18 and 19, just as in FIGURE 1.

The up-travelling waves are stored as the trace 38 on drum 24, while the down-travelling waves are recorded on drum 24 as trace 37. It is the latter trace that is utilized as the second input into the earth surface S, corresponding to trace 44a of FIGURE 3. For this purpose, selector switches 26 and 80 are thrown to the left, and trace 37 is reproduced by head 23 feeding amplifier 34'. The output of the amplifier passes to a maximum or peak-detecting circuit 77, which scans the trace and produces an output pulse for each wave arrival exceeding a certain minimum amplitude. That is, circuit 77 produces a series of impulses spaced in time corresponding to the impulses of trace 44a of FIGURE 3. A circuit suitable for producing electrical impulses corresponding to the arrival times of reflection pulses, as shown by pulse peaks or troughs, as shown in U.S. Patent 3,159,808. Alternatively, the arrival times of the up-travelling wave events that subsequently produce multiple reflections may be determined by visual interpretation of a visible-trace record of these waves, and electrical pulses for controlling the operation of firing pulse generator 78 can be provided by a circuit like that shown in FIGURE 7 of U.S. Patent 3,142,750, where the times when desired pulses are to occur are set by decade dials. These impulses control the generation of firing pulses by a firing-pulse generator circuit 78, which actuates a sequence firing control mechanism 79 having electrical leads connected to the detonators of each of the charges 70–75.

This control detonates charges 71–75 in sequence, the detonation of charge 71, for example, corresponding to the impulse 47 of trace 44a, and the detonations of charges 72–75 corresponding to the subsequent impulses of trace 44a.

The final up-travelling waves received at detector 12, as composited by reproducer head array 19, are recorded through amplifier 20 by recording head 22' as the storage trace 38'. For a final display, the traces 38 and 38' are simultaneously reproduced by heads 22 and 22', respectively connected to reproducing amplifiers 39 and 39', and the amplifier outputs are algebraically combined for recording as a single trace by the visible-trace recorder 28. As some or all of the impulses from shots 72–75 may not have the correct amplitude and polarity to cancel multiple reflections, a series of side-by-side display traces are normally made by recorder 28 utilizing different gain settings of one of the amplifiers, such as 39. Also, a second series of traces with amplifier 39 at different gain settings will ordinarily be made after throwing the reversing switch 33', so that if with one polarity the ratio of multiple to primary reflection energy was increased for a given reflection, a decrease or cancellation could be expected to occur for the other polarity of switch 33'. For any given multiple reflection, one of the gain settings will be found to give nearly complete cancellation.

In the final display, the multiple and the primary reflections can generally be readily differentiated by the fact that the amplitude variation of the multiple reflections with changing gain of the amplifier 39 takes place much more rapidly than for the primary reflections. That is, when they reinforce, the multiple reflection amplitude builds up more rapidly.

I claim:

1. A method of seismic geophysical surveying wherein certain multiple reflections are at least partially cancelled, which method comprises the steps of
   generating in the earth at a given input location an initial seismic-wave signal,
   detecting at a detection point about vertically below said input location, at a depth beneath at least one down-reflecting interface, the resulting down-travelling seismic waves including a first arrival of said initial signal and subsequent arrivals representing down reflections of seismic waves from at least said interface,
   reproducibly recording said down-travelling seismic waves,
   reproducing said recorded down-travelling waves as a second seismic-wave input signal,
   utilizing said second input signal alone to generate corresponding seismic waves in the earth at said location,
   detecting at said detection point second up-travelling seismic waves resulting from said second input signal wherein the waves corresponding to said subsequent arrivals have altered the ratio of primary to multiple-reflection amplitudes as compared with its value for said initial signal, and
   displaying said up-travelling waves in such a way as to utilize said altered reflection-amplitude ratio to produce a substantial degree of multiple-reflection cancellation.

2. A method as in claim 1 including also the step of reversing the phase of said subsequent arrivals relative to said first arrival of said down-going waves, prior to the generation of said corresponding seismic waves by said second input signal, whereby said subsequent arrivals tend to automatically cancel said multiple reflections as they are received at said detection depth.

3. A method as in claim 1 including also the steps of detecting at said detection depth first up-travelling seismic waves resulting from said initial signal and including primary and multiple reflections in a first amplitude ratio, reproducibly recording said first up-travelling waves, reproducibly recording said second up-travelling waves, and said displaying step comprising simultaneously reproducing said first and second up-travelling waves, subtractively combining said first and second reproduced up-travelling waves with a plurality of different relative amplitudes such that, at one of said relative amplitudes, certain of said multiple reflections are substantially cancelled due to said altered ratio, and displaying at least that trace of said up-travelling waves wherein said multiple reflections are minimized relative to said primary reflections.

4. A method as in claim 1 including also the steps of detecting at said detection point first up-travelling waves resulting from said initial signal and including primary and multiple reflections in a first amplitude ratio, reproducibly recording said first up-travelling waves, reproducibly recording said second up-travelling waves, wherein said ratio has a second amplitude ratio different from said first ratio, and said displaying step comprising simultaneously reproducing said first and second recorded up-travelling waves, adjusting the amplitudes of said reproduced waves to make the amplitudes of corresponding multiple reflections therein substantially equal, subtracting said amplitude-adjusted waves, and displaying the resultant remainder waves wherein the multiple reflections are substantially reduced relative to the primaries.

5. A method as in claim 4 wherein said second ratio is larger than said first ratio, and said amplitude adjusting step comprises amplifying said first reproduced waves more than said second reproduced waves by an amount to make amplitudes of corresponding multiple reflections substantially equal.

6. A method as in claim 1 wherein said step of utilizing said second input signal comprises applying said second signal to the servo control of a servo-controlled vibration generator in contact with the ground surface.

7. A method as in claim 1 wherein the steps of generating said initial and said second input signals comprises applying said signal to the servo control of at least one servo-controlled vibration generator in contact with the ground surface.

8. A method as in claim 1 wherein said step of generating said initial signal comprises applying to the servo control of at least one servo-controlled vibration generator in contact with the ground surface a varying-frequency signal of several seconds duration and containing frequencies readily transmitted by the earth as seismic waves.

9. A method as in claim 1 wherein said step of generating said initial signal comprises detonating a first explosive charge in seismic-wave generating contact with the earth, and said step of generating corresponding seismic waves in the earth comprises detonating in sequence a plurality of explosive charges in seismic-wave generating contact with the earth at times corresponding to the arrival times of said first and subsequent arrivals of said down-travelling waves.

10. A method as in claim 9 including the steps of reproducibly recording a first trace of up-travelling waves received at said detection point from the detonation of said first charge, reproducibly recording a second trace of up-travelling waves received at said detection point from the detonations in sequence of said plurality of charges, and said displaying step comprising simultaneously reproducing said first and second traces a plurality of times with different relative amplitudes and polarities, combining said simultaneously reproduced traces, and displaying a corresponding plurality of resultant traces of said combined traces, in some of which resultant traces certain multiple reflections are substantially reduced due to being of similar amplitude and opposite polarity in said simultaneously reproduced traces.

11. Apparatus for seismic geophysical surveying comprising controllable means for generating seismic waves in the earth, a directional detector of vertically-travelling seismic waves in the earth below said generating means, means for reproducibly recording signals corresponding to at least the down-travelling seismic waves received by said detector, means for reproducing said recorded signals as corresponding electric waves, means utilizing only said electric waves and controlling said generating means to produce corresponding seismic waves in the earth, and means responsive to the output of said detector for recording a trace of the up-travelling waves received by said detector.

12. Apparatus as in claim 11 including polarity reversing means associated with said reproducing means for reversing the phase of subsequent recorded signals relative to the recorded first-arriving signal in said down-travelling seismic waves.

13. Apparatus for seismic geophysical surveying comprising a plurality of spaced explosive charges near the earth's surface, a vertical spread of seismic wave detectors in the earth below said charges and below the chief near-surface interfaces capable of down-reflecting seismic waves to produce multiple reflections, delay means connected to said spread for compositing the detector outputs into up- and down-travelling seismic waves respectively, means for separately recording reproducible traces of said up- and down-travelling seismic waves, means for reproducing said down-travelling waves and producing a succession of electrical impulses with the time spacing of the direct and subsequent down-going seismic wave arrivals passing said spread, and means for utilizing only said electrical impulses to detonate said charges in sequence with the same time spacings as said direct subsequent down-travelling seismic wave arrivals.

References Cited

UNITED STATES PATENTS

| 2,740,945 | 4/1956 | Howes | 340—15.5 |
|---|---|---|---|
| 2,792,067 | 5/1957 | Peterson | 181—0.5 |
| 3,096,846 | 7/1963 | Savit et al. | 181—0.5 |
| 3,185,250 | 5/1965 | Glazier | 181—0.5 |
| 3,278,893 | 10/1966 | Silverman | 181—0.5 X |

RODNEY D. BENNETT, *Primary Examiner.*

BENJAMIN A. BORCHELT, *Examiner.*

M. F. HUBLER, *Assistant Examiner.*